US006976070B1

(12) United States Patent
Hoashi et al.

(10) Patent No.: US 6,976,070 B1
(45) Date of Patent: Dec. 13, 2005

(54) METHOD AND APPARATUS FOR AUTOMATIC INFORMATION FILTERING USING URL HIERARCHICAL STRUCTURE AND AUTOMATIC WORD WEIGHT LEARNING

(75) Inventors: Keiichirou Hoashi, Tokyo (JP); Naomi Inoue, Tokyo (JP); Kazuo Hashimoto, Fujimi (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/503,757

(22) Filed: Feb. 14, 2000

(30) Foreign Application Priority Data

| Feb. 16, 1999 | (JP) | ............................. P11-037525 |
| Jul. 15, 1999 | (JP) | ............................. P11-201988 |

(51) Int. Cl.[7] ........................................ G06F 15/173
(52) U.S. Cl. ................ 709/224; 709/203; 709/217; 709/225; 707/104.1; 713/201
(58) Field of Search ............................. 709/217, 219, 709/203, 224, 229, 225; 713/201, 200; 707/5, 707/9, 100, 104.1; 715/716

(56) References Cited

U.S. PATENT DOCUMENTS

| 5,696,898 | A | * | 12/1997 | Baker et al. ................ 713/201 |
| 5,706,507 | A | * | 1/1998 | Schloss .................... 707/104.1 |
| 5,826,025 | A | * | 10/1998 | Gramlich ................... 709/217 |
| 5,826,267 | A | * | 10/1998 | McMillan ...................... 707/9 |
| 5,832,212 | A | * | 11/1998 | Cragun et al. .............. 713/202 |
| 5,835,722 | A | * | 11/1998 | Bradshaw et al. .......... 709/225 |
| 5,878,233 | A | * | 3/1999 | Schloss ...................... 709/225 |
| 5,896,502 | A | * | 4/1999 | Shieh et al. ................ 709/224 |
| 5,911,043 | A | * | 6/1999 | Duffy et al. ................ 709/203 |
| 5,930,792 | A | * | 7/1999 | Polcyn ........................... 707/9 |
| 5,933,600 | A | * | 8/1999 | Shieh et al. ................ 709/219 |
| 5,961,645 | A | * | 10/1999 | Baker ......................... 713/201 |
| 5,987,606 | A | * | 11/1999 | Cirasole et al. ............. 713/200 |
| 5,987,611 | A | * | 11/1999 | Freund ....................... 713/201 |
| 5,999,942 | A | * | 12/1999 | Talati ....................... 707/104.1 |
| 6,037,935 | A | * | 3/2000 | Bates et al. ................. 345/760 |
| 6,038,598 | A | * | 3/2000 | Danneels .................... 709/219 |
| 6,065,055 | A | * | 5/2000 | Hughes et al. .............. 709/229 |
| 6,072,483 | A | * | 6/2000 | Rosin et al. ................. 715/716 |
| 6,177,936 | B1 | * | 1/2001 | Cragun ....................... 345/760 |
| 6,182,081 | B1 | * | 1/2001 | Dietl et al. .................. 707/102 |

(Continued)

FOREIGN PATENT DOCUMENTS

JP            5-204975            8/1993

(Continued)

OTHER PUBLICATIONS

Chaperon, CornerPost Software, Inc., "CornerPost Software products information" May 18, 2000, 5 pages, http://www.cornerpostsw.com/news/patent.asp.*

(Continued)

Primary Examiner—Andrew Caldwell
Assistant Examiner—Hai V. Nguyen
(74) Attorney, Agent, or Firm—Olson & Hierl, Ltd.

(57) ABSTRACT

Disclosed method and apparatus for automatic information filtering are capable of improving both precision and recall and accurately judging inappropriateness of the content even for a page that contains very few or no text information and only displays images, by utilizing an upper level URL of a URL given in a hierarchical structure. Also, disclosed method and apparatus for automatic information filtering are capable of setting weights of words easily and accurately and judging inappropriateness of the information by utilizing these weights, by using an automatic learning based on a linear discrimination function that can discriminate the inappropriate information and the appropriate information on a vector space.

6 Claims, 15 Drawing Sheets

U.S. PATENT DOCUMENTS

| | | | |
|---|---|---|---|
| 6,233,618 B1 * | 5/2001 | Shannon | 709/229 |
| 6,336,117 B1 * | 1/2002 | Massarani | 707/100 |
| 6,366,947 B1 * | 4/2002 | Kavner | 709/203 |
| 6,381,632 B1 * | 4/2002 | Lowell | 709/203 |
| 6,411,952 B1 * | 6/2002 | Bharat et al. | 707/5 |
| 6,429,879 B1 * | 8/2002 | Sturgeon et al. | 345/723 |
| 6,701,350 B1 * | 3/2004 | Mitchell | 709/217 |

FOREIGN PATENT DOCUMENTS

| | | |
|---|---|---|
| JP | 7-129593 | 5/1995 |
| JP | 8-87508 | 4/1996 |
| JP | 9-54780 | 2/1997 |
| JP | 9-231241 | 9/1997 |
| JP | 10-40156 | 2/1998 |
| JP | 10-240762 | 9/1998 |
| JP | 10-275157 | 10/1998 |
| JP | 11-161670 | 6/1999 |
| JP | 11-259689 | 9/1999 |

OTHER PUBLICATIONS

The Big IF, Turner and Sons Productions, Inc., "The Big IF product overview" 1995, 9 pages, http://www.internetfilter.com/products.html.*

Robin Whittle, "Internet Censorship, Access Control And Content Regulation", Dec. 10, 1996, First Principles Consulting, 14 pages.*

Paul Resnick, James Miller, "PICS: Internet Access Controls Wothout Censorship", ACM, Inc. 1996, 10 pages.*

Icole Hinnebusch, "Restricting Internet Access In Public Libraries", May 1998, The Yale Pilitical Quarterly, vol. 19, No. 4, 9 pages.*

World talk, "The Guide To Content Security", 1998, Corporate Whitepaper, Worldtalk Corporation, 10 pages.*

Suzanne Hildreth, "Filtering: Big Brother Or Little Helper", Dec. 1998, Sun Expert Magazine, pp. 62-65.*

* cited by examiner

FIG.2
PRIOR ART

```
<HTML>
<HEAD>
<TITLE>
Example of RSAC1 and SafeSurf Rated Page
</TITLE>

<META http-equiv-"PICS-Label" content- '(PICS-1.0
"http://www./rsac.org/ratingav01.html"
1 gen true comment "RASC1 North America Serber" by
"marks@icrosys.com" for "http://www.samplesite.com" on
"1996.09.05T02:15-0800" exp "1997.09.05T02:15-0800"
r (n 2 s 0 v 1 1 2))'>

<META http-equiv-"PICS-Label" content- '(PICS-1.1
"http://www.classify.org/safesurf/" 1 gen t for
"http://www.samplesite.com/"
r (SS~~000 2 SS~~100 1))'>

</HEAD>
<BODY>
...
```

PRECISION & RECALL OF VARIOUS KNOWN FILTERING SCHEME

| SCHEME | PRECISION | RECALL |
|---|---|---|
| SELF-RATING | LOW | LOW |
| THIRD PARTY RATING | HIGH | LOW |
| AUTOMATIC FILTERING | LOW | HIGH |

FIG.7

HTML PAGE HARMFULNESS RATING STANDARD

| LEVEL | RATING | DESCRIPTION |
| --- | --- | --- |
| 1 | HARMLESS | PAGE WITH NO SEXUAL EXPRESSION |
| 2 | PARTLY HARMFUL | PAGE WITH NO DIRECT SEXUAL EXPRESSION BUT CONTENT IMPLYING SEXUAL EXPRESSION |
| 3 | HARMFUL | PAGE CONTAINING SEXUAL EXPRESSION |

FIG.8

HTML DATA HARMFULNESS RATING RESULT

| LEVEL | NUMBER OF DOCUMENTS | RATE |
| --- | --- | --- |
| 1 | 6230 | 22.2% |
| 2 | 2055 | 7.3% |
| 3 | 19749 | 70.4% |

FIG.9

HTML DATA DESCRIPTION LANGUAGE SURVEY RESULT

| LANGUAGE | NUMBER OF DOCUMENTS | RATE |
| --- | --- | --- |
| ENGLISH | 15448 | 55.1% |
| JAPANESE | 10839 | 38.7% |
| OTHERS | 1747 | 6.2% |

FIG.10

RATES OF UPPER & LOWER LEVEL PAGES OF HTML DATA IN HARMFUL DATA

| TYPE | NUMBER OF DOCUMENTS | RATE |
| --- | --- | --- |
| UPPER LEVEL DATA | 1495 | 6.9% |
| LOWER LEVEL DATA | 20309 | 93.1% |

FIG.12

PRECISION & RECALL OF AUTOMATIC
FILTERING ON ALMOST TEXTLESS HTML DATA

| min | PRECISION | RECALL |
|---|---|---|
| 5 | 88.2% | 6.5% |
| 10 | 92.1% | 41.4% |
| 15 | 91.0% | 44.8% |
| 20 | 91.6% | 49.5% |

FIG.13

PRECISION & RECALL OF AUTOMATIC FILTERING
ACCOUNTING FOR URL HIERARCHICAL STRUCTURE

| min | PRECISION | RECALL |
|---|---|---|
| 5 | 91.1% | 68.2% |
| 10 | 91.7% | 79.8% |
| 15 | 90.1% | 80.7% |
| 20 | 90.2% | 82.0% |

FIG.18

| WEIGHTED WORD LIST | |
|---|---|
| WORD | WORD WEIGHT w |
| ⋮ | |
| IMAGE | 10.9 |
| ⋮ | ⋮ |
| SAMPLE | 18.7 |
| ⋮ | ⋮ |
| ACCIDENT | -16.6 |
| ⋮ | ⋮ |
| HIGH SCHOOL GIRL | 82.2 |
| ⋮ | ⋮ |
| BUS | -101.9 |
| ⋮ | ⋮ |
| HOKKAIDO | -112.5 |
| ⋮ | ⋮ |
| FREE | -6.3 |
| ⋮ | ⋮ |

METHOD AND APPARATUS FOR AUTOMATIC INFORMATION FILTERING USING URL HIERARCHICAL STRUCTURE AND AUTOMATIC WORD WEIGHT LEARNING

BACKGROUND OF THE INVENTION

1. Field of the Invention

The present invention relates to method and apparatus for automatic information filtering by which inappropriate or harmful information such as pornographic images among various information provided through the Internet is identified and blocked from being presented.

2. Description of the Background Art

In conjunction with the rapid spread of the Internet, computers that had only been tools of limited specialists in the past are now being introduced even to ordinary homes and schools. For this reason, even ordinary persons who have no prior experiences with computers can now make accesses to the Internet very easily. With this background, the serious problem that arose in recent years is accesses by children to harmful information such as pornographic images that are abound on the Internet. In order to cope with this problem, in the United States, a bill called "communications decency act" which allows the governmental organization to censor information on the Internet was proposed, but failed to pass into law because the Supreme Court's decision that this act violates the constitution that guarantees the freedom of expression.

This has prompted much interests in the technique called "information filtering" recently. The information filtering is a technique by which harmfulness of an information on the Internet that a user attempts to access is checked at a time of the access, and the access to this information is blocked by some means when this information is judged as harmful.

Methods employed by currently commercially available harmful information filtering softwares can be largely classified into the following four.

(1) Filtering based on self-rating
(2) Filtering based on third party rating
(3) Automatic filtering
(4) Method using scores (points) assigned to words In the following each of these four methods will be briefly described.

First, in the filtering scheme based on self-rating, the WWW information provider himself rates harmfulness of the content provided by himself, and labels each HTML (HyperText Markup Language) file with the result of the self-rating. The filtering software refers to this self-rating result label of each HTML file and blocks access to the HTML file that is labelled as harmful. FIG. 1 shows an outline of this filtering scheme.

The filtering based on self-rating shown in FIG. 1 utilizes the standard for labelling the Internet contents called PICS (Platform for Internet Content Selection) that were created by the World Wide Web Consortium of the Massachusetts Institute of Technology. Using PICS, the content provider can easily label the information provided by himself and discloses such a label.

In many cases, the information provider wishing to disclose such rating results utilizes a service of the rating organization that provides rating results based on PICS. The most representatives of such rating organizations include Recreational Software Advisory Council (RSAC) and Safe-Surf, each of which provides rating results based on its own independently created standard. The information provider labels a header of each HTML file according to the rating result obtained from such a rating organization. FIG. 2 shows an exemplary labelling based on the rating result.

This self-rating presently relies on the voluntary initiative by the contents provider. For this reason, it can be said that the effective harmful information filtering according to this scheme is impossible unless many contents providers show their willingness to utilize the ratings of this scheme.

Next, the filtering based on third party rating will be described. There are some developers of harmful information filtering software who adopt a scheme for rating harmfulness of home pages (web cites) on the WWW independently and setting the own rating results as the rating standard of the filtering software. In general, a list of URLs (Uniform Resource Locators) of harmful home pages are constructed as a result of this rating. This URL list is distributed to users along with the filtering software, and utilized as the rating standard of the filtering software. In many cases, the filtering software incorporates a mechanism for periodically downloading this harmful URL list. FIG. 3 shows an outline of the harmful information filtering based on third party rating.

A representative software having such a mechanism is CyberPatrol. The CyberPatrol has harmful URL list for each one of thirteen categories including "violence" and "sexuality", and carries out the harmful information filtering according to these harmful URL lists.

The harmful URL list used in this scheme is created and updated by each software developer who actually accesses and rates each home page, so that it is impossible to deal with newly produced home pages or those home pages that have moved from the original URLs to different URLs. Consequently, it is presently impossible to deal with the filtering with respect to these home pages that are not targets of the rating.

Next, the automatic filtering will be described. There are some filtering softwares which check the content of the accessed home page and judge harmfulness of the accessed home page. Such an idea has already been introduced in early filtering softwares. For example, there had been a software which carries out the processing for prohibiting access to a URL that contains character strings such as "sex" or "xxx". More specifically, the harmful information, i.e., words that may potentially contained in inappropriate information, is registered in advance, and whether such a registered word appears in the accessed information or not is checked, and then the presentation of this information is blocked in the case where the registered word is contained in that information. As a variation of this scheme, there is also a scheme which blocks the presentation of the information in the case where a rate by which the registered words are contained in the information exceeds a prescribed threshold.

Also, some softwares for verifying contents of the home pages have also been developed. One such software for carrying out the automatic filtering is CyberSITTER. This software realizes the filtering by a scheme in which the accessed page is outputted after removing harmful words contained in that page.

However, this scheme is associated with the following two problems. First, there is a problem regarding the processing time required in carrying out this automatic rating. In this type of processing, the required processing time is about several milliseconds, which is not terribly long, but there is an undeniably possibility that even such a short processing time may cause some frustration to users.

Another problem is the precision of the automatic filtering. In the case of adopting the rating algorithm which judges harmfulness in units of words, a possibility for blocking many harmless pages is high. In fact, there is a report of an undesirable incidence in which a home page related to a British town of "Sussex" is blocked. Moreover, in the case of carrying out the automatic filtering by paying attention only to text information within the page, there is also a problem that it is impossible to block a page on which only an image is displayed.

Next, the method using scores (points) assigned to words will be described. In this method, words that may potentially contained in inappropriate information and scores for these words are registered in advance, and whether such a registered word appears in the accessed information or not is checked. Then, the total score of the words that appear in that information is calculated and the presentation of this information is blocked in the case where the calculated total score exceeds a prescribed threshold.

However, in this method, the setting of the registered words and their scores are ad hoc, so that there has been no known policy regarding what kind of setting is most convenient to users. For this reason, there has been a problem related to its performance such that information that should have been blocked cannot be blocked or information that should not have been blocked is blocked.

For example, suppose that a phrase "high school girl" is registered with a score of 40 under the assumption that this phrase often appears in the pornographic information in general. Then, an expression "sample images of a high school girl for free" will have the total score of 40 as it contains a phrase "high school girl". However, another expression "a car accident in Hokkaido involving high school girls on a bus" will also have the total score of 40, so that these two expressions have the same score. If the threshold is set at 20, there arises a problem that the latter expression will also be blocked even though there is no need to block this expression. On the other hand, if the threshold is set at 50, there arises another problem that the former expression will not be blocked even though it should be blocked. In order to distinguish these two expressions, it is necessary to set scores also to other words such as "sample", "image", "free", "bus", "Hokkaido", "accident", etc., but these are words that are often used ordinarily, so that what score should be set to such words is unclear. Moreover, the performance will be largely affected by the score setting, so that there arises a problem that the sufficient performance cannot be achieved in judging whether a given expression is inappropriate or not.

As described, the big goal of the automatic information filtering is to increase a rate for blocking inappropriate information while reducing a rate for blocking appropriate information by mistake. Referring to a rate of actually harmful pages among blocked pages as precision and a rate of blocked pages among actually harmful pages as recall, it can be said that the goal of the filtering software is to increase both precision and recall.

FIG. 4 shows a table indicating characteristics of three of the conventional methods described above. As can be seen from FIG. 4, each of the conventional schemes described above is superior to the others in some respects but inferior to the others in some other respects, so that there has been a problem that it is presently impossible to obtain a sufficient filtering performance by the conventional automatic information filtering.

Also, as described above, the conventional automatic filtering is carried out by paying attention only to text information within a page, so that there has been a problem that it is impossible to block a page that contains very few or no text information and only displays images.

SUMMARY OF THE INVENTION

It is therefore an object of the present invention to provide method and apparatus for automatic information filtering which are capable of improving both precision and recall and accurately judging inappropriateness of the content even for a page that contains very few or no text information and only displays images, by utilizing an upper level URL of a URL given in a hierarchical structure.

It is another object of the present invention to provide method and apparatus for automatic information filtering capable of setting weights of words easily and accurately and judging inappropriateness of the information by utilizing these weights.

According to one aspect of the present invention there is provided a method of automatic information filtering for identifying inappropriate information among various information provided through Internet and blocking presentation of identified inappropriate information, comprising the steps of: entering an HTML (HyperText Markup Language) information provided through the Internet; judging whether a URL (Uniform Resource Locator) of said HTML information entered from the Internet is a top page URL or not, the top page URL being a URL ending with a prescribed character string defined according to a URL hierarchical structure by which each URL is constructed; extracting words appearing in information indicated by the top page URL and carrying out an automatic filtering to judge whether said information indicated by the top page URL is inappropriate or not according to the words extracted from said information indicated by the top page URL, when said URL of said HTML information is the top page URL; registering an upper level URL derived from the top page URL into an inappropriate upper level URL list and blocking presentation of said information indicated by the top page URL, when said information indicated by the top page URL is judged as inappropriate by the automatic filtering, the upper level URL being derived from the top page URL by keeping a character string constituting the top page URL only up to a rightmost slash; comparing said URL of said HTML information with each URL registered in the inappropriate upper level URL list and judging whether there is any matching URL in the inappropriate upper level URL list when said URL of said HTML information is not the top page URL, and blocking presentation of information indicated by said URL of said HTML information when there is a matching URL in the inappropriate upper level URL list, the matching URL being one upper level URL whose character string is contained in said URL of said HTML information; extracting words appearing in said information indicated by said URL of said HTML information, and carrying out the automatic filtering to judge whether said information indicated by said URL of said HTML information is inappropriate or not according to the words extracted from said information indicated by said URL of said HTML information, when there is no matching URL in the inappropriate upper level URL list; and blocking presentation of said information indicated by said URL of said HTML information when said information indicated by said URL of said HTML information is judged as inappropriate by the automatic filtering.

According to another aspect of the present invention there is provided an automatic information filtering apparatus for identifying inappropriate information among various information provided through Internet and blocking presentation of identified inappropriate information, comprising: an input unit for entering an HTML (HyperText Markup Language) information provided through the Internet; a top page URL judging unit for judging whether a URL (Uniform Resource Locator) of said HTML information entered from the Internet is a top page URL or not, the top page URL being a URL ending with a prescribed character string defined according to a URL hierarchical structure by which each URL is constructed; a first automatic filtering unit for extracting words appearing in information indicated by the top page URL and carrying out an automatic filtering to judge whether said information indicated by the top page URL is inappropriate or not according to the words extracted from said information indicated by the top page URL, when said URL of said HTML information is the top page URL; an inappropriate upper level URL list registration unit for registering an upper level URL derived from the top page URL into an inappropriate upper level URL list and blocking presentation of said information indicated by the top page URL, when said information indicated by the top page URL is judged as inappropriate by the automatic filtering, the upper level URL being derived from the top page URL by keeping a character string constituting the top page URL only up to a rightmost slash; an inappropriate URL judging unit for comparing said URL of said HTML information with each URL registered in the inappropriate upper level URL list and judging whether there is any matching URL in the inappropriate upper level URL list when said URL of said HTML information is not the top page URL, and blocking presentation of information indicated by said URL of said HTML information when there is a matching URL in the inappropriate upper level URL list, the matching URL being one upper level URL whose character string is contained in said URL of said HTML information; a second automatic filtering unit for extracting words appearing in said information indicated by said URL of said HTML information, and carrying out the automatic filtering to judge whether said information indicated by said URL of said HTML information is inappropriate or not according to the words extracted from said information indicated by said URL of said HTML information, when there is no matching URL in the inappropriate upper level URL list; and an information presentation blocking unit for blocking presentation of said information indicated by said URL of said HTML information when said information indicated by said URL of said HTML information is judged as inappropriate by the automatic filtering.

According to another aspect of the present invention there is provided a computer usable medium having computer readable program codes embodied therein for causing a computer to function as an automatic information filtering apparatus for identifying inappropriate information among various information provided through Internet and blocking presentation of identified inappropriate information, the computer readable program codes include: a first computer readable program code for causing said computer to enter an HTML (HyperText Markup Language) information provided through the Internet; a second computer readable program code for causing said computer to judge whether a URL (Uniform Resource Locator) of said HTML information entered from the Internet is a top page URL or not, the top page URL being a URL ending with a prescribed character string defined according to the URL hierarchical structure by which each URL is constructed; a third computer readable program code for causing said computer to extract words appearing in information indicated by the top page URL and carry out an automatic filtering to judge whether said information indicated by the top page URL is inappropriate or not according to the words extracted from said information indicated by the top page URL, when said URL of said HTML information is the top page URL; a fourth computer readable program code for causing said computer to register an upper level URL derived from the top page URL into an inappropriate upper level URL list and block presentation of said information indicated by the top page URL, when said information indicated by the top page URL is judged as inappropriate by the automatic filtering, the upper level URL being derived from the top page URL by keeping a character string constituting the top page URL only up to a rightmost slash; a fifth computer readable program code for causing said computer to compare said URL of said HTML information with each URL registered in the inappropriate upper level URL list and judge whether there is any matching URL in the inappropriate upper level URL list when said URL of said HTML information is not the top page URL, and block presentation of information indicated by said URL of said HTML information when there is a matching URL in the inappropriate upper level URL list, the matching URL being one upper level URL whose character string is contained in said URL of said HTML information; a sixth computer readable program code for causing said computer to extract words appearing in said information indicated by said URL of said HTML information, and carry out the automatic filtering to judge whether said information indicated by said URL of said HTML information is inappropriate or not according to the words extracted from said information indicated by said URL of said HTML information, when there is no matching URL in the inappropriate upper level URL list; and a seventh computer readable program code for causing said computer to block presentation of said information indicated by said URL of said HTML information when said information indicated by said URL of said HTML information is judged as inappropriate by the automatic filtering.

According to another aspect of the present invention there is provided a method of automatic information filtering for identifying inappropriate information among various information provided through Internet and blocking presentation of identified inappropriate information, comprising the steps of: obtaining word weights of words to be used in judging whether presentation of each information should be blocked or not according to words contained in each information, by an automatic learning using learning data containing inappropriate information whose presentation should be blocked and appropriate information whose presentation should not be blocked; storing and managing the word weights in correspondence to respective words in a form of a weighted word list; extracting words contained in information entered from the Internet; and reading out the word weight for each word extracted from said information, from the weighted word list, calculating a total sum of the word weights of the words extracted from said information, and judging whether or not presentation of said information should be blocked or not according to the total sum.

According to another aspect of the present invention there is provided an automatic information filtering apparatus for identifying inappropriate information among various information provided through Internet and blocking presentation of identified inappropriate information, comprising: a word weight learning unit for obtaining word weights of words to be used in judging whether presentation of each information should be blocked or not according to words contained in each information, by an automatic learning using learning data containing inappropriate information whose presentation should be blocked and appropriate information whose presentation should not be blocked; a weighted word list storing unit for storing and managing the word weights in correspondence to respective words in a form of a weighted word list; a word extraction unit for extracting words contained in information entered from the Internet; and a judging unit for reading out the word weight for each word extracted from said information, from the weighted word list, calculating a total sum of the word weights of the words extracted from said information, and judging whether or not presentation of said information should be blocked or not according to the total sum.

According to another aspect of the present invention there is provided a computer usable medium having computer readable program codes embodied therein for causing a computer to function as an automatic information filtering apparatus for identifying inappropriate information among various information provided through Internet and blocking presentation of identified inappropriate information, the computer readable program codes include: a first computer readable program code for causing said computer to obtain word weights of words to be used in judging whether presentation of each information should be blocked or not according to words contained in each information, by an automatic learning using learning data containing inappropriate information whose presentation should be blocked and appropriate information whose presentation should not be blocked; a second computer readable program code for causing said computer to store and manage the word weights in correspondence to respective words in a form of a weighted word list; a third computer readable program code for causing said computer to extract words contained in information entered from the Internet; and a fourth computer readable program code for causing said computer to read out the word weight for each word extracted from said information, from the weighted word list, calculate a total sum of the word weights of the words extracted from said information, and judge whether or not presentation of said information should be blocked or not according to the total sum.

Other features and advantages of the present invention will become apparent from the following description taken in conjunction with the accompanying drawings.

BRIEF DESCRIPTION OF THE DRAWINGS

FIG. 2 is a diagram showing an exemplary labelling according to RSACi and SafeSurf used in the conventional information filtering scheme based on self-rating.

FIG. 7 is a table summarizing an exemplary HTML page harmfulness rating standard used in an evaluation test of the first embodiment of the present invention.

FIG. 8 is a table summarizing a HTML data harmfulness rating result used in the evaluation test of the first embodiment of the present invention.

FIG. 9 is a table summarizing a HTML data description language survey result used in the evaluation test of the first embodiment of the present invention.

FIG. 10 is a table summarizing rates of upper and lower level pages of HTML data in harmful data used in the evaluation test of the first embodiment of the present invention.

FIG. 12 is a table summarizing precision and recall of automatic filtering on almost textless HTML data obtained in the evaluation test of the first embodiment of the present invention.

FIG. 13 is a table summarizing precision and recall of automatic filtering accounting for URL hierarchical structure obtained in the evaluation test of the first embodiment of the present invention.

FIG. 18 is a diagram showing an example of a weighted word list used in the automatic information filtering apparatus of FIG. 16.

DETAILED DESCRIPTION OF THE PREFERRED EMBODIMENTS

Referring now to FIG. 5 to FIG. 13, the first embodiment of method and apparatus for automatic information filtering according to the present invention will be described in detail.

Figure 5:
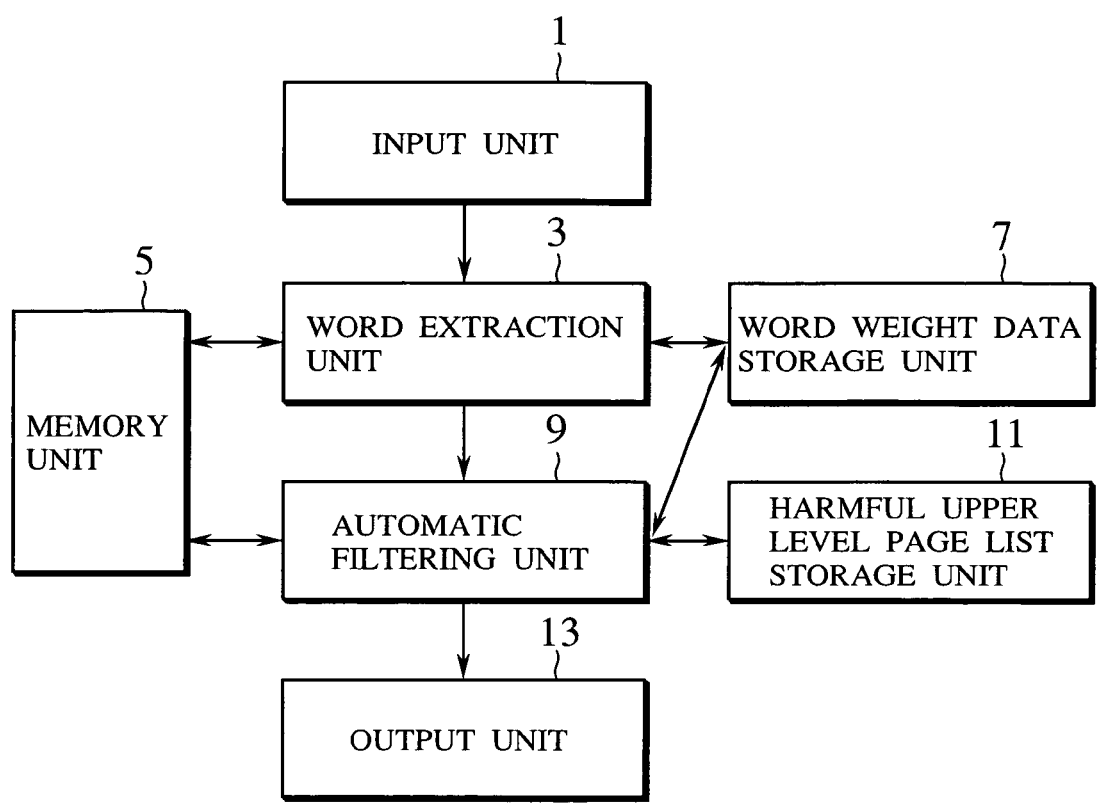
FIG. 5 is a block diagram showing a configuration of an automatic information filtering apparatus according to the first embodiment of the present invention.

FIG. 5 shows a configuration of an automatic information filtering apparatus utilizing URL hierarchical structure according to the first embodiment.

Figure 1:
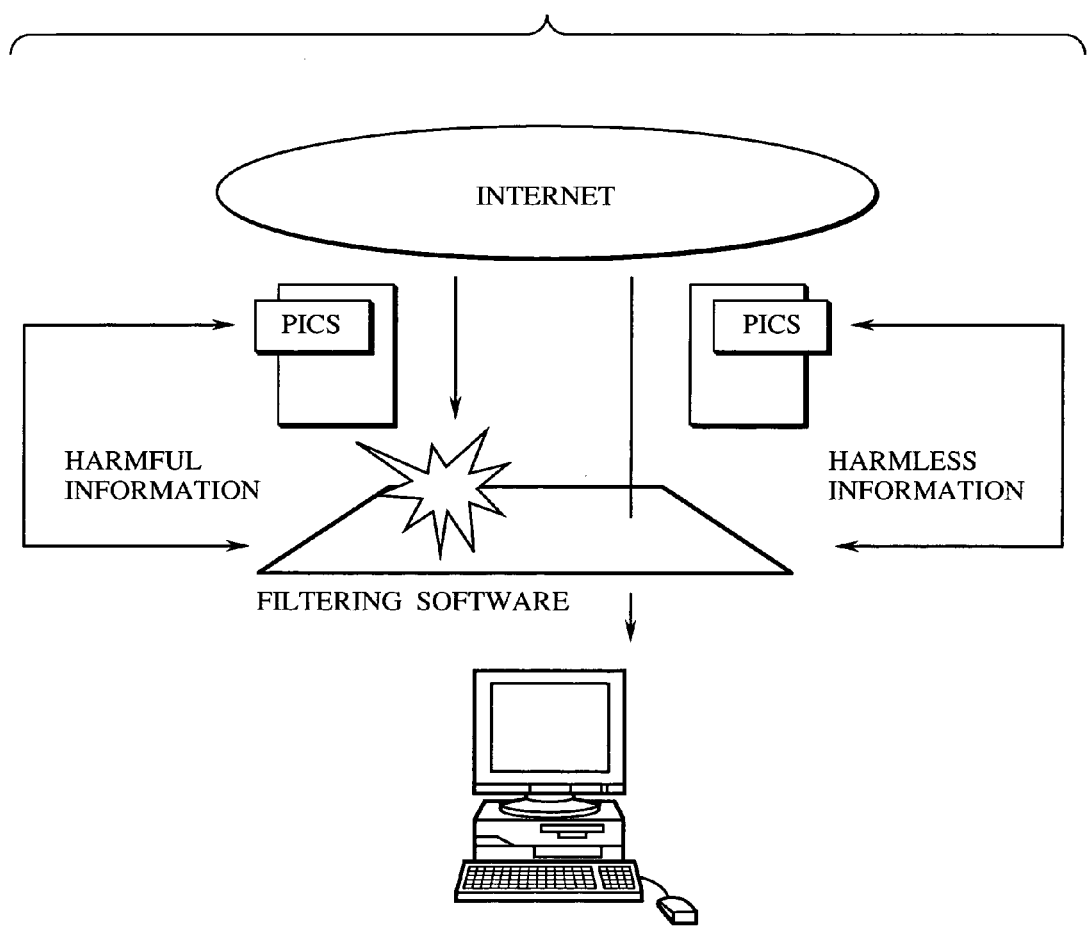
FIG. 1 is a schematic diagram for explaining a conventional information filtering scheme based on self-rating.
Figures 3, 4:
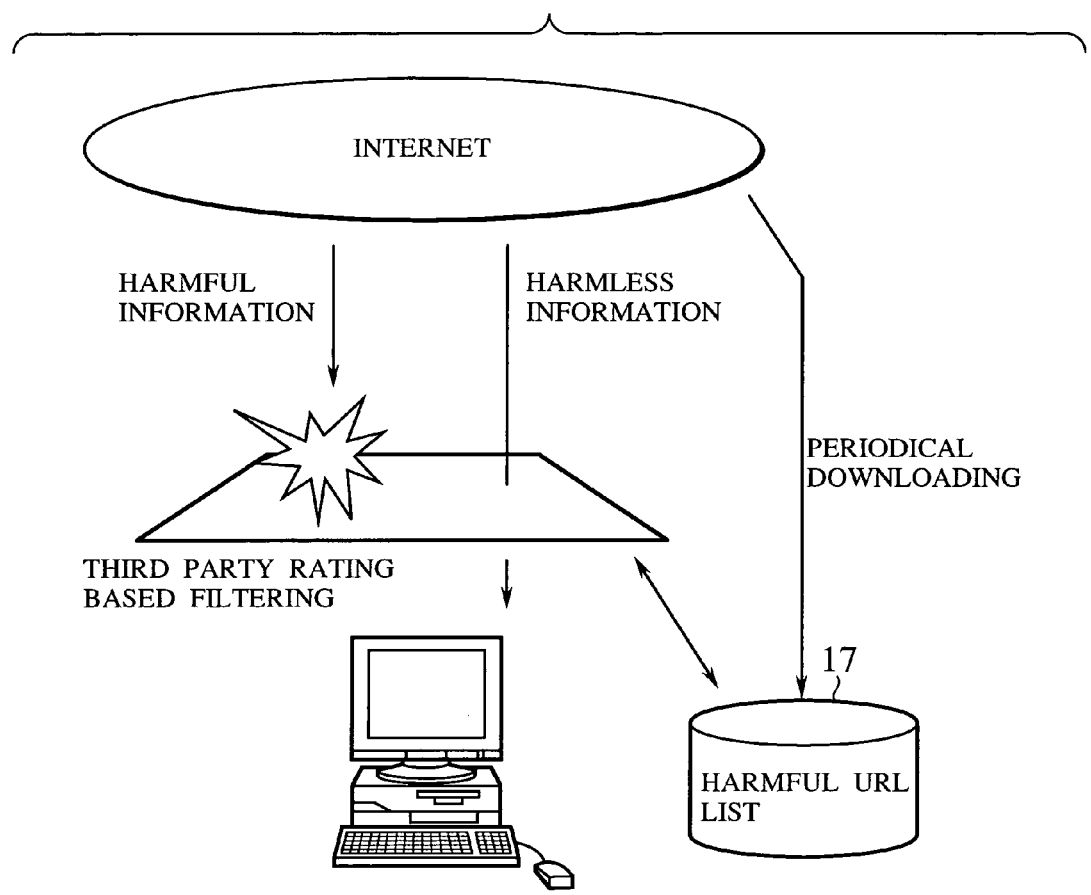
FIG. 3 is a schematic diagram for explaining a conventional information filtering scheme based on third party rating.
FIG. 4 is a table summarizing precision and recall of various conventionally known information filtering schemes.

The automatic information filtering apparatus of FIG. 1 identifies inappropriate or harmful information such as pornographic images among various information provided through the Internet, and blocks presentation of the identified inappropriate information.

As shown in FIG. 5, this automatic information filtering apparatus comprises an input unit 1 for entering HTML information provided through the Internet, a word extraction unit 3 for extracting words that appear in the entered information, a memory unit 5 for storing the extracted words, a software that executes an automatic information filtering processing of this embodiment, and various other information, a word weight data storage unit 7 for storing word weight data, an automatic filtering unit 9 for carrying out the automatic filtering, a harmful upper level page list storage unit 11 for storing a harmful upper level page list in a form of a table, and an output unit 13 for outputting a result of the filtering.

The automatic information filtering apparatus of the first embodiment carries out the filtering of harmful information by utilizing an upper level URL of a URL having a URL hierarchical structure, and the basic concept behind this filtering will now be described.

As described above, one of the major problems associated with the automatic filtering is the difficulty of the filtering with respect to home pages having very few or no text information. In particular many pornographic harmful information pages are expected to be pages on which only images are presented, so that there is a need to provide a measure against such almost textless pages. However, if a user is a typical WWW user, it is expected that the user will trace links in order to access an image page that contains only images. If this assumption is correct, it is possible to block access to the image page by carrying out the filtering with respect to the hierarchically upper level pages reaching to the image page. A method for carrying out the filtering with respect to this hierarchically upper level page will now be described.

First, a top page is defined as a page whose URL ends with any one of the following seven character strings.

(1) index.html
(2) index.htm
(3) index.shtml
(4) welcome.html
(5) welcome.htm
(6 welcome.shtml
(7)/

For instance, pages having URLs such as "http://www.kdd.co.jp/index.html" or "http://www.asahi.com/" will be regarded as the top page. Among these top pages, those pages which are judged as harmful by the filtering software will be stored into the harmful upper level page list as a harmful upper level page. At this point, rather than storing the entire URL of the top page that is judged as harmful, only a URL up to the most deep directory within that URL, i.e., a URL obtained by keeping the character string of that URL only up to the rightmost slash, will be stored as a registered URL of the harmful upper level page. For example, if "http://www.###.co.jp/index.html" is harmful, "http://www.###.co.jp/" is stored in the list, and if "http://www.###.co.jp/aaa/bbb/ccc/index.html" is harmful, "http://www.###.co.jp/aaa/bbb/ccc/" is stored in the list.

At a time of access to a page other than the top pages, a URL of the accessed page and URLs listed in the harmful upper level page list are compared before the usual automatic harmfulness judgement. As a result of the comparison, if directories of a URL of the accessed page match with one of URLs listed in the harmful upper level page list, this page is judged as harmful. Here, a URL of the accessed page is said to match with a registered URL when that URL of the accessed page contains a character string constituting the registered URL. For example, if "http://www.###.co.jp/" is registered in the harmful upper level page list, both "http://www.###.co.jp/aaa/bbb.html" and "http://www.###.co.jp/nantoka.html" will be judged as harmful. On the other hand, if directories of a URL of the access page do not match with any URL listed in the harmful upper level page list, harmfulness of the accessed page is judged by the automatic filtering software.

The automatic information filtering apparatus of this embodiment is formed to block the harmful information according to the above described idea.

Figure 6:
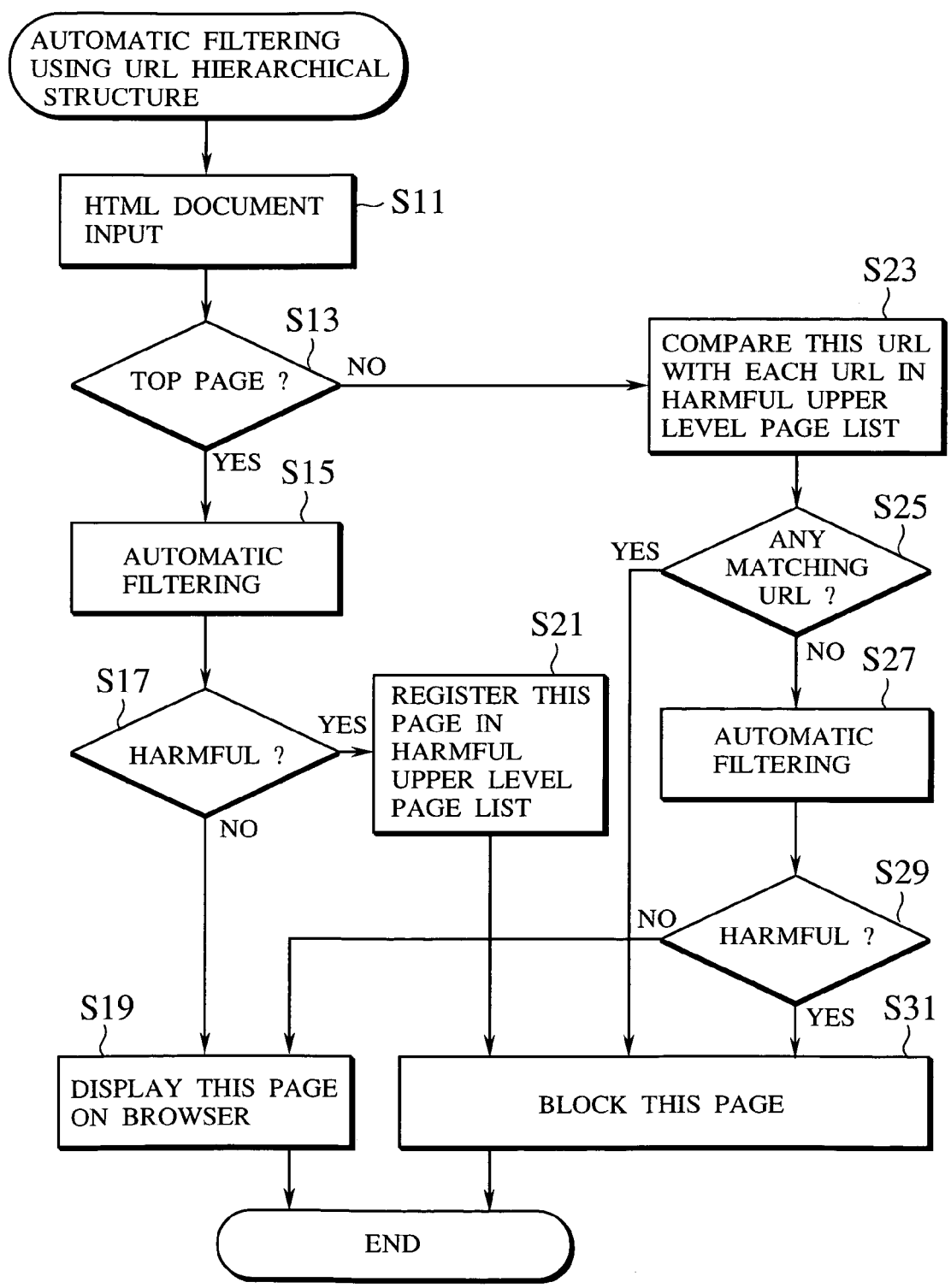
FIG. 6 is a flow chart for an operation of the automatic information filtering apparatus of FIG. 5.

Referring now to FIG. 6, the operation of the automatic information filtering apparatus utilizing URL hierarchical structure of FIG. 5 will be described.

In FIG. 6, an HTML document which is an HTML information provided through the Internet is entered from the input unit 1 (step S11), and whether this entered HTML document is a top page or not is judged by checking whether a URL of this HTML document is a top poage URL or not (step S13). As a result of this judgement, if a URL of the entered HTML document is a top page URL, words appearing in a document, i.e., information indicated by this top page URL are extracted by the word extraction unit 3, and the automatic filtering by the automatic filtering unit 9 according to the extracted words is carried out (step S15), and then whether this information is harmful or not is judged (step S17).

As a result of this judgement regarding harmfulness of the information by the automatic filtering, if the information is harmful, the harmful upper level URL derived from the top page URL is registered into the harmful upper level page list in the harmful upper level page list storage unit 11 (step S21), and presentation of this information is blocked and the processing is finished (step S31).

On the other hand, as a result of the judgement at the step S17, if the information is not harmful, this information is displayed on a browser by the output unit 13 and the processing is finished (step S19).

Also, as a result of the judgement regarding whether it is a top page or not at the step S13, if it is not a top page, this URL is compared with each URL registered in the harmful upper level page list in the harmful upper level page list storage unit 11 (step S23), and whether there is any matching URL or not, i.e., whether this URL contains character string of any registered URL or not, is checked (step S25). As a result of this checking, if there is a matching URL in the harmful upper level page list, presentation of the information indicated by this URL is blocked and the processing is finished (step S31).

Also, as a result of the checking as to whether there is any matching URL or not at the step S25, if there is no matching URL, words appearing in the information indicated by this URL are extracted by the word extraction unit 3, and the automatic filtering by the automatic filtering unit 9 according to the extracted words is carried out (step S27), and then whether this information is harmful or not is judged (step S29).

As a result of this judgement regarding harmfulness of the information by the automatic filtering, if the information is harmful, presentation of this information is blocked and the processing is finished (step S31).

On the other hand, as a result of the judgement at the step S29, if the information is not harmful, this information is displayed on a browser by the output unit 13 and the processing is finished (step S19).

In order to evaluate the effect of the automatic information filtering apparatus utilizing URL hierarchical structure of the first embodiment, the following evaluation test was conducted.

As evaluation data in this evaluation test, a large number of harmful pages were collected using a software ("collector robot") for automatically collecting data on the WWW. This collector robot was activated from an HTML page containing links to 290 harmful pages (including 160 pages in Japanese and 130 pages in English), and collected HTML documents that were accessed while tracing these links sequentially. Note that the collected data are all HTML documents, and image data, speech data, etc. are not collected. As a result, 28034 HTML documents were collected.

Next, harmfulness of individual collected HTML document is rated by the subjective rating using three levels. Note that this rating is related to the presence or absence of sexual expression in each page. FIG. 7 shows the rating standard for each rating level. FIG. 8 shows the result the harmfulness rating with respect to the collected data. In addition to this harmfulness rating, the language in which each page is described is surveyed. FIG. 9 shows the result of this survey. Also, among these data, a rate of data corresponding to the above described "harmful upper level pages" among all the harmful data is surveyed. Here, the harmful data are taken to be those data for which the harmfulness rating result is level 2 or level 3. FIG. 10 shows the result of this survey.

Next, the automatic filtering algorithm used by the automatic filtering unit 9 of the automatic information filtering apparatus of FIG. 5, in particular the automatic filtering algorithm used in the above described evaluation test, will be described. Note that this automatic filtering uses a vector space model used in the information retrieval, the automatic classification, etc.

First, the HTML documents entered from the input unit 1 are expressed by the vector space model. Namely, n pieces of words that constitute all the documents are selected, and each document is expressed as an n-dimensional vector given by the following equation (1).

$$\vec{V}d=(f_{d1}, \ldots f_{di}, \ldots, f_{dn}) \quad (1)$$

Each element of this vector is given by a normalized frequency of appearances of each word in a document d. The frequency of appearances of each word is normalized by a method called TF* IDF which is expressed by the following equation (2).

$$f_{di}=tf_{di}*\log(N/df_i) \quad (2)$$

where $tf_{d1}$ is the frequency of appearances of a word i in a document d, N is the total number of documents, and $df_i$ is the number of documents in which a word i appears.

The automatic filtering is realized by using a linear discrimination function given by the following equation (3), by which a total sum Dis(d) of the word weights is calculated.

$$Dis(d) = \sum_{i=1}^{n} Wi*f_{di} \quad (3)$$

where $w_i$ is a weight of each word i, and $f_{di}$ is the normalized frequency of appearances of each word i in a document d given by the above equation (2).

Using the above equation (3), a document is judged as harmful if the total sum Dis(d) is greater than 0, or as harmless if the total sum Dis(d) is less than or equal to 0. Note that the weight of each word i is set such that Dis(d)>0 when a document d is harmful and Dis(d)≦0 when a document d is harmless.

Figure 11:
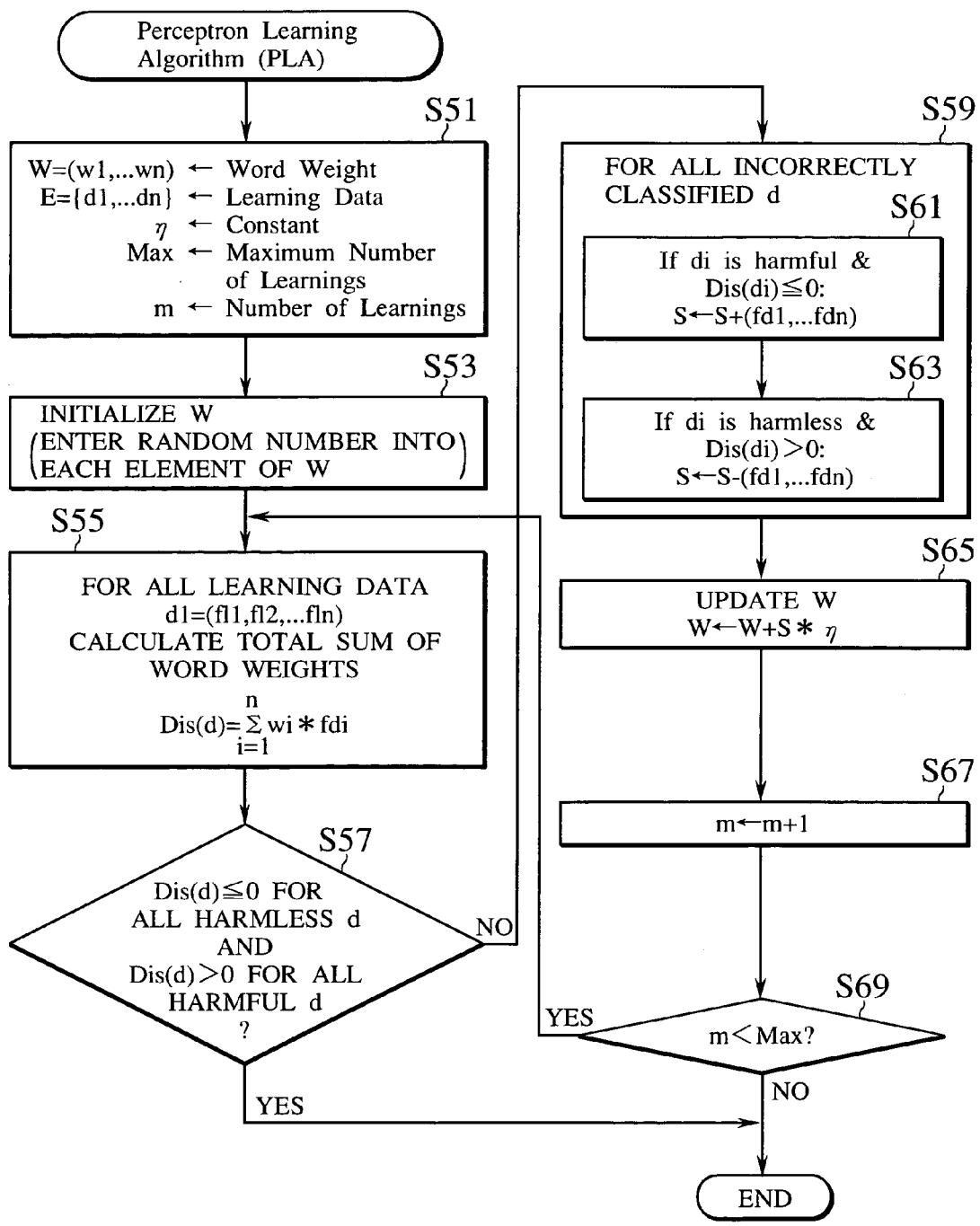
FIG. 11 is a flow chart for a word weight setting procedure used in the automatic information filtering apparatus of FIG. 5.

Next, with reference to FIG. 11, the setting of the word weight will be described. Here, the perceptron learning algorithm (PLA) is used for the learning of the word weight.

First, various parameters are set up (step S51). These parameters include a set of word weights W=($w_1, \ldots, w_n$), N pieces of learning data E={$d_1, \ldots, d_N$}, a constant η, a maximum number of learnings Max, and a number of learnings m for which the learning processing of FIG. 11 is to be repeated.

Next, a set of word weights W is initialized (step S53). In this initialization, a random number is entered into each word weight. Then, the total sum Dis(d) of the word weights for all the learning data is calculated by the above equation (3) (step S55).

Then, whether Dis≦0 for all harmless documents d and Dis(d)>0 for all harmful documents d as a result of this calculation or not is checked (step S57). If this is the case, the processing is finished, but otherwise, a variation level S of the weight is corrected for all the incorrectly classified documents d (step S59). More specifically, if a document $d_i$ is harmful and Dis(di)≦0, the weight variation level S is increased to S+(fd1, . . . , fdn) (step S61), whereas if a document $d_i$ is harmless and Dis(di)>0, the weight variation level S is decreased to S−(fd1, . . . , fdn) (step S63).

Then, using the weight variation level S so corrected, the set of word weights W is updated to W+S*n (step S65), and the number of learnings m is incremented by one (step S67). Then, whether this incremented number of learnings m is less than the maximum number of learnings Max or not is checked (step S69). If m<Max, the processing returns to the step S55, and the processing from the step S55 on is repeated until the condition of the step S57 is satisfied.

Next, an evaluation test of the automatic information filtering apparatus utilizing URL hierarchical structure of the first embodiment will be described. This evaluation test comprises the following three processes:

(1) Extraction of a set of words constituting documents;

(2) Learning of a weight for each word; and (3) Final evaluation.

First, in the word extraction process, the morphemic analysis was carried out with respect to 5912 documents in Japanese among the collected data, and nouns, proper nouns, and undefined words are extracted. Here the morphemic analysis software for Japanese was used so that English words contained in the documents were extracted as undefined words. Also, at a time of this morphemic analysis, a list of words regarding sexual expressions that are not included in the standard dictionary was compiled and used along with the standard Japanese dictionary. This special word list registers about 1000 words. Also, among the extracted words, those words whose frequency of appearances is less than or equal to 20 over the entire data were removed. As a result, 8013 words were extracted.

In the weight learning, a part of the evaluation data were used. These learning data comprised 18387 HTML documents. Among them, 9263 were documents in English, 8171 were documents in Japanese, and 953 were documents in other languages. The final evaluation was made for the entire evaluation data including the word extraction data and the learning data.

In order to prove the assumption that the filtering with respect to almost textless HTML documents is difficult, the conventional filtering with respect to documents for which a total number of words appearing in each HTML document is less than or equal to a threshold min was carried out, and the precision and the recall of this filtering were obtained as the evaluation result. FIG. 12 shows this evaluation result.

As apparent from this evaluation result, when the number of words is decreased, the recall is noticeably lowered although the precision was not affected significantly. Consequently, it can be said that the assumption that the filtering with respect to almost textless HTML documents is difficult was proved.

Next, the filtering accounting for the URL hierarchical structure was carried out with respect to the same evaluation data, and the precision and the recall of this filtering were similarly obtained. FIG. 13 shows this evaluation result.

This evaluation result demonstrates that it was possible to increase the recall considerably while maintaining the high precision by adopting the automatic filtering scheme of the present invention. From these results, it can be said that the effectiveness of the present invention was proved.

Figure 14:
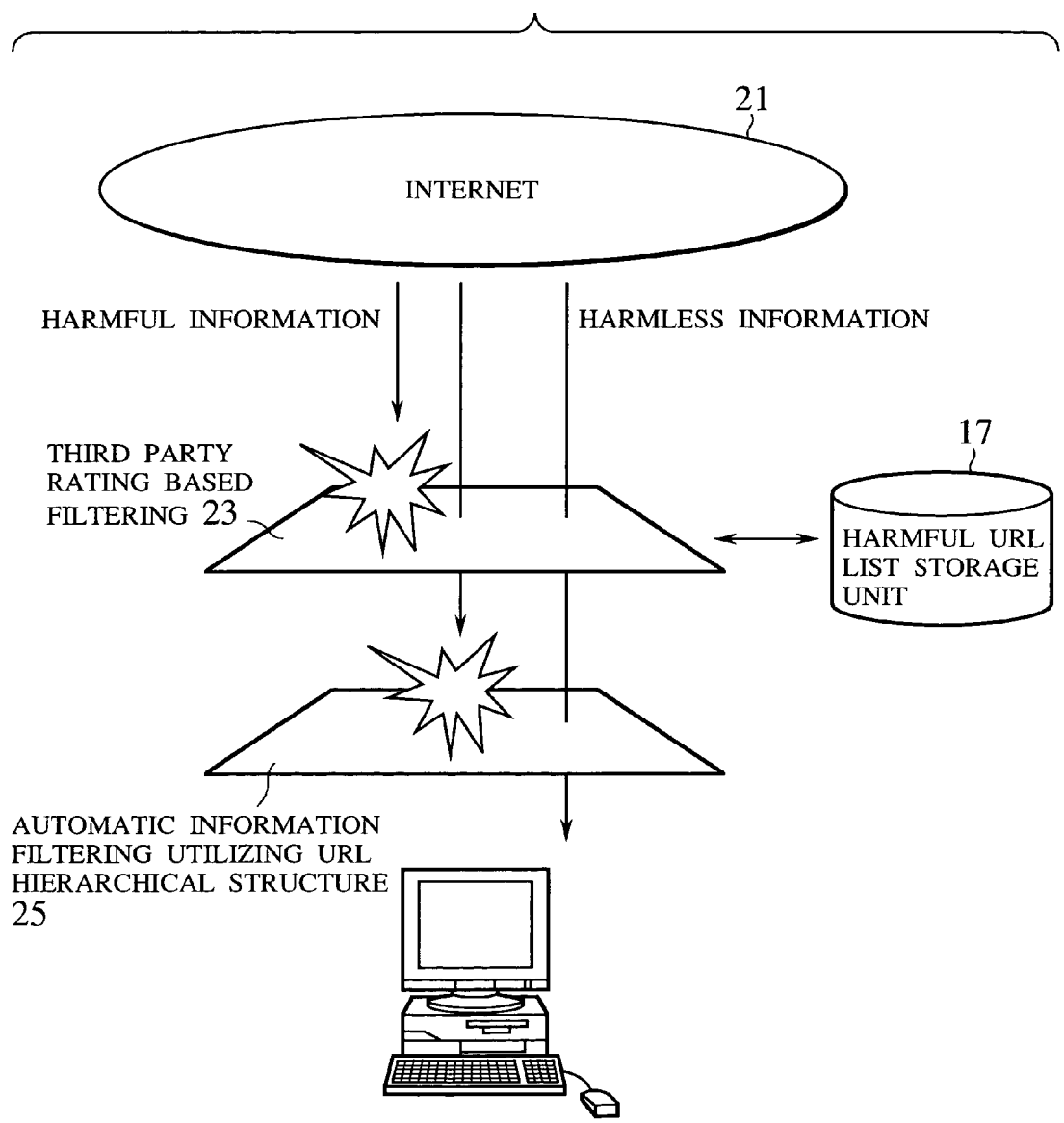
FIG. 14 is a schematic diagram showing an outline of an automatic information filtering apparatus according to the second embodiment of the present invention.
Figure 15:
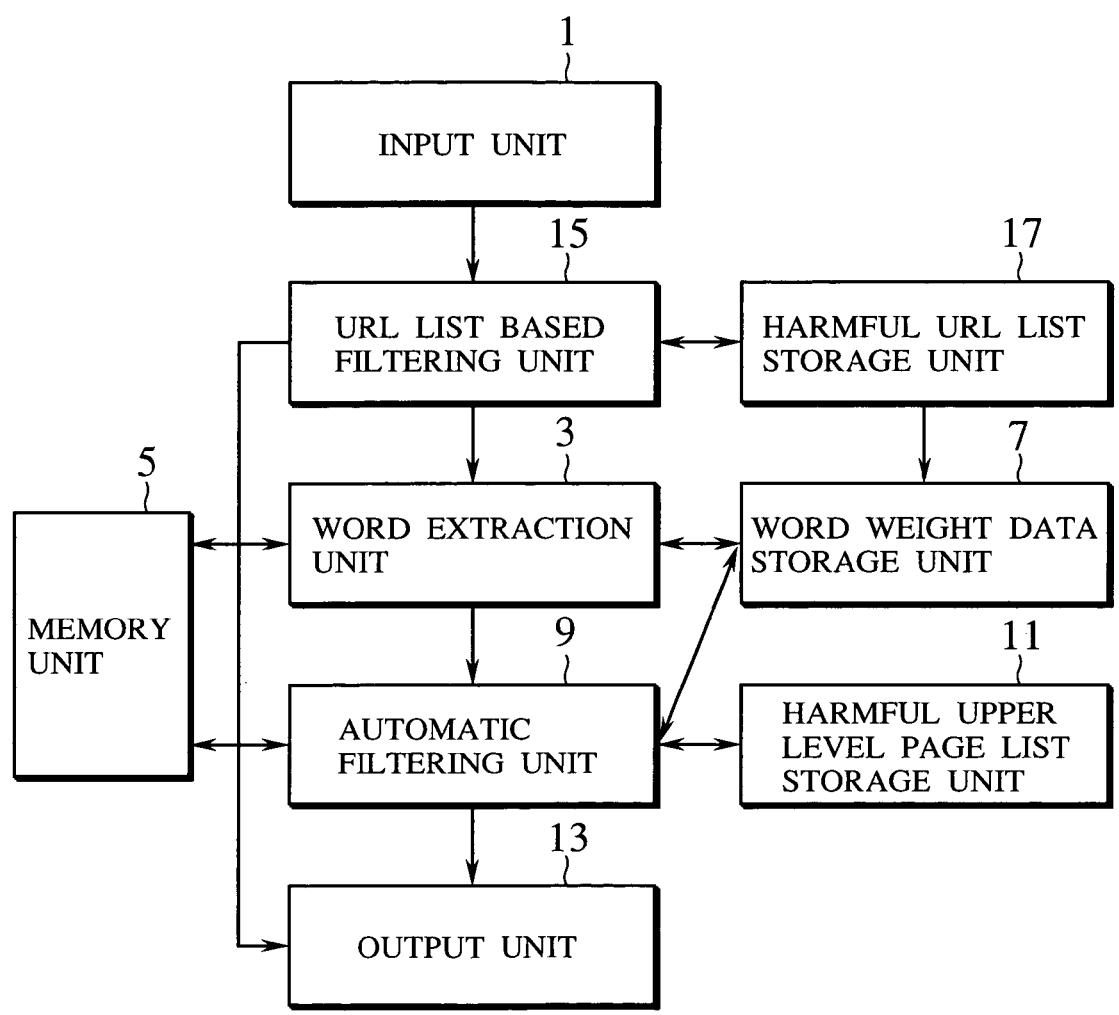
FIG. 15 is a block diagram showing a configuration of the automatic information filtering apparatus according to the second embodiment of the present invention.

Referring now to FIG. 14 and FIG. 15, the second embodiment of method and apparatus for automatic information filtering according to the present invention will be described in detail.

In this second embodiment, the automatic information filtering apparatus utilizing URL hierarchical structure of the first embodiment described above is modified by adding a third party rating based filtering processing unit for carrying out the filtering based on the third party rating, so as to achieve the ideal filtering by combining these two filtering processings.

In the automatic information filtering apparatus shown in FIG. 14, a third party rating based filtering 23 using a harmful URL list storage 17 in referring to harmful URLs is added to the automatic information filtering utilizing URL hierarchical structure 25 of the first embodiment.

The harmful URL list storage unit 17 stores URLs that provide harmful information in a form of a harmful URL list, and the third party rating based filtering 23 compares a URL of the HTML document entered from the input unit 1 with each URL registered in the harmful URL list in the harmful URL list storage unit 17 to see if there is any matching URL or not.

FIG. 15 shows a detailed configuration of the automatic information filtering apparatus of FIG. 14, which comprises the input unit 1, the word extraction unit 3, the memory unit 5, the word weight data storage unit 7, the automatic filtering unit 9, the harmful upper level page list storage unit 11, and the output unit 13, which are the same as those constituting the automatic information filtering apparatus of FIG. 5, as well as a URL list based filtering unit 15 corresponding to the third party rating based filtering 23 of FIG. 14 and the harmful URL list storage unit 17.

In this automatic information filtering apparatus of FIG. 15, a URL of the HTML document entered at the input unit 1 from the Internet 21 is compared with each URL registered in the harmful URL list in the harmful URL list storage unit 17, to see if there is any matching URL or not, by the URL list based filtering unit 15. Then, if there is a matching URL in the harmful URL list, presentation of information indicated by this URL is blocked.

On the other hand, if there is no matching URL in the harmful URL list as a result of referring to the harmful URL list by the URL list based filtering unit 15, the automatic information filtering utilizing URL hierarchical structure is carried out by the automatic filtering unit 9 as in the first embodiment.

In this second embodiment, both the third party rating based filtering and the filtering utilizing URL hierarchical structure are carried out so that it is possible to detect and block the harmful information accurately.

As described, according to the first and second embodiments, if a URL of the HTML information is a top page URL, the automatic filtering is carried out with respect to information indicated by this top page URL, and if this information is inappropriate as a result of the filtering, the upper level URL derived from this top page URL is registered into an inappropriate upper level URL list while presentation of this information is blocked. On the other hand, if the URL is not a tpo page URL, this URL is compared with each URL in the inappropriate upper level URL list. Then, if there is a matching URL, presentation of information indicated by this URL is blocked, whereas if there is no matching URL, the automatic filtering is carried out with respect to information indicated by this URL, and if this information is inappropriate as a result of the filtering, presentation of this information is blocked. Consequently, inappropriateness of the HTML information can be judged accurately even in the case of almost textless page in which only images are presented and such an inappropriate HTML information can be blocked, so that both the precision and the recall can be improved.

Moreover, by carrying out the third part rating based filtering in which URLs that provide inappropriate information are registered as an inappropriate URL list, a URL of the HTML information is compared with each URL in the inappropriate URL list, and presentation of information indicated by this URL is blocked if there is a matching URL, in addition to the automatic information filtering utilizing URL hierarchical structure, it is possible to realize a more complete filtering.

Referring now to FIG. 16 to FIG. 20, the third embodiment of method and apparatus for automatic information filtering according to the present invention will be described in detail.

Figure 16:
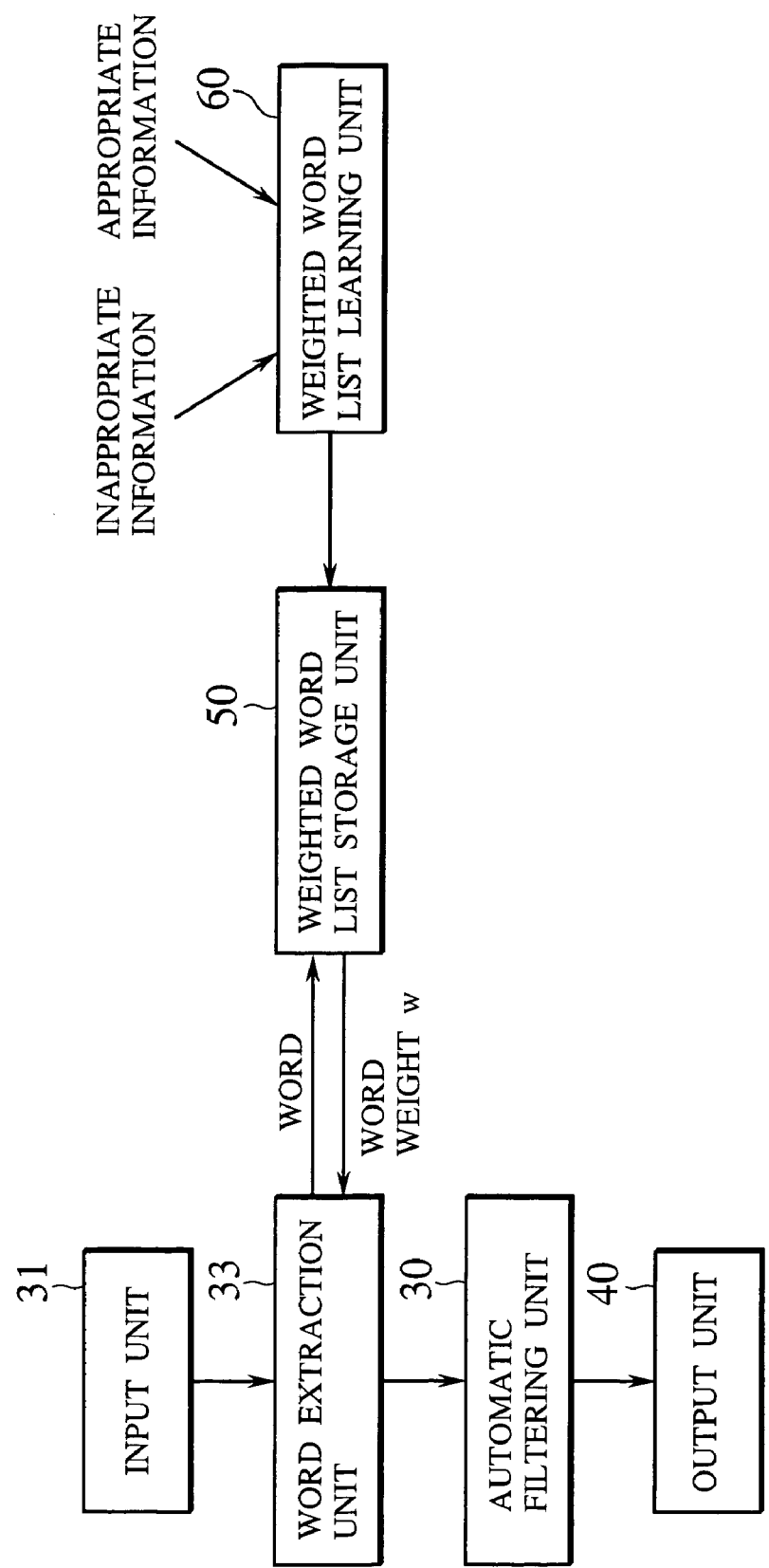
FIG. 16 is a block diagram showing a configuration of the automatic information filtering apparatus according to the third embodiment of the present invention.

FIG. 16 shows a configuration of an automatic information filtering apparatus according to the third embodiment, which obtains word weights by an automatic learning, judges whether information is inappropriate or not by utilizing word weights obtained by the automatic learning, and blocking presentation of inappropriate information.

As shown in FIG. 16, this automatic information filtering apparatus comprises an input unit 31 for entering HTML information provided through the Internet, a word extraction unit 33 for extracting words that appear in the entered information, a weighted word list learning unit 60 for obtaining word weights that are used in judging whether there is a need to block presentation of information or not according to words contained in the document, by the automatic learning using learning data including documents which are inappropriate information whose presentation should be blocked and documents which are appropriate information whose presentation should not be blocked, a weighted word list storage unit 50 for storing and managing word weights obtained by the weighted word list learning unit 60 in corresponding to respective words in a form of a weighted word list, an automatic filtering unit 30 for judging whether presentation of information entered from the input unit 31 should be blocked or not according to the words extracted by the word extraction unit 33 and the word weights w of the extracted words obtained from the weighted word list storage unit 50, and an output unit 40 for outputting a result of the filtering carried out by the automatic filtering unit 30.

The automatic information filtering apparatus of the third embodiment is characterized in that the word weights are obtained in advance by the automatic learning at the weighted word list learning unit 60, and these word weights obtained by the automatic learning are utilized in the filtering.

Figure 17:
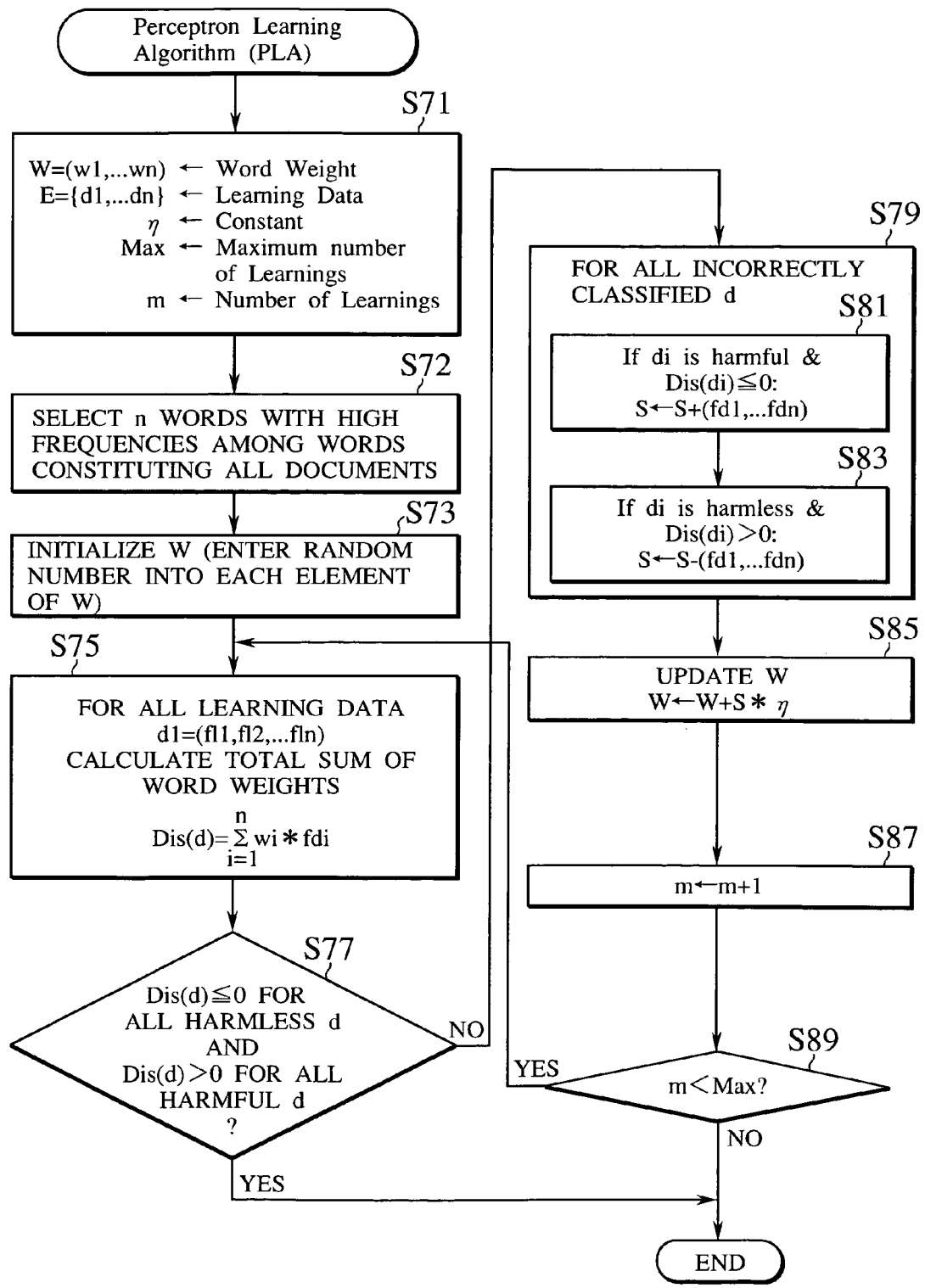
FIG. 17 is a flow chart for a word weight setting procedure used in the automatic information filtering apparatus of FIG. 16.

The automatic learning of the word weights is carried out by a word weight learning algorithm shown in FIG. 17. In the learning algorithm of FIG. 17, inappropriate information whose presentation should be blocked and appropriate information whose presentation should not be blocked are entered into the weighted word list learning unit 60 as a set learning data E={d1, . . . , dn}, and the word weights are obtained using a linear discrimination function for discriminating the entered inappropriate information from the entered appropriate information, as follows.

First, the HTML documents entered from the input unit 31 are expressed by the vector space model. Namely, n pieces of words that constitute all the documents are selected, and each document is expressed as an n-dimensional vector given by the following equation (1).

$$\vec{V}_d = (f_{d1}, \ldots, f_{di}, \ldots, f_{dn}) \quad (1)$$

Each element of this vector is given by a normalized frequency of appearances of each word in a document d. The frequency of appearances of each word is normalized by a method called TF* IDF which is expressed by the following equation (2).

$$f_{di} = tf_{di} * \log(N/df_i) \quad (2)$$

where $tf_{d1}$ is the frequency of appearances of a word i in a document d, N is the total number of documents, and $df_i$ is the number of documents in which a word i appears.

The automatic filtering is realized by using a linear discrimination function given by the following equation (3), by which a total sum Dis(d) of the word weights is calculated.

$$Dis(d) = \sum_{i=1}^{n} Wi * f_{di} \quad (3)$$

where $w_i$ is a weight of each word i, and $f_{di}$ is the normalized frequency of appearances of each word i in a document d given by the above equation (2).

Using the above equation (3), a document is judged as harmful if the total sum Dis(d) is greater than 0, or as harmless if the total sum Dis(d) is less than or equal to 0. Note that the weight of each word i is set such that Dis(d)>0 when a document d is harmful and Dis(d)≦0 when a document d is harmless.

Next, with reference to FIG. 17, the word weight learning algorithm will be described. Here, the perceptron learning algorithm (PLA) is used for the learning of the word weight.

First, various parameters are set up (step S71). These parameters include a set of word weights W=($w_1$, . . . , $w_n$), N pieces of learning data E={$d_1$, . . . , $d_N$}, a constant η, a maximum number of learnings Max, and a number of learnings m for which the learning processing of FIG. 11 is to be repeated.

Then, n pieces of words with high frequencies among words constituting all the documents are selected (step S72).

Next, a set of word weights W is initialized (step S73). In this initialization, a random number is entered into each word weight. Then, the total sum Dis(d) of the word weights for all the learning data is calculated by the above equation (3) (step S75).

Then, whether Dis≦0 for all harmless documents d and Dis(d)>0 for all harmful documents d as a result of this calculation or not is checked (step S77). If this is the case, the processing is finished, but otherwise, a variation level S of the weight is corrected for all the incorrectly classified documents d (step S79). More specifically, if a document di is harmful and Dis(di)≦0, the weight variation level S is increased to S+(fd1, . . . , fdn) (step S81), whereas if a document $d_i$ is harmless and Dis(di)>0, the weight variation level S is decreased to S−(fd1, . . . , fdn) (step S83).

Then, using the weight variation level S so corrected, the set of word weights W is updated to W+s*n (step S85), and the number of learnings m is incremented by one (step S87). Then, whether this incremented number of learnings m is less than the maximum number of learnings Max or not is checked (step S89). If m<Max, the processing returns to the step S75, and the processing from the step S75 on is repeated until the condition of the step S77 is satisfied.

In this way, a set of word weights for the n pieces of words can be obtained eventually.

The weight of each word obtained by the weighted word list learning unit 60 is stored in correspondence to each word as the weighted word list in the weighted word list storage unit 50. FIG. 18 shows the weighted word list stored in the weighted word list storage unit 50, in which the word weight w is stored in correspondence to each word.

Next, the processing for judging whether information provided from the Internet is inappropriate information or not according to the word weights obtained by the weighted word list learning unit 60 and stored in the weighted word list storage unit 50 will be described.

In the automatic information filtering apparatus of FIG. 16, the information from the Internet entered at the input unit 31 is compared with the word list stored in the weighted word list storage unit 50, and words that appear in the entered information and their frequencies of appearances are obtained at the word extraction unit 33. At the same time, the word weights w of the appeared words are obtained from the weighed word list storage unit 50, and the appeared words, their frequencies of appearances, and their word weights are given to the automatic filtering unit 30. The automatic filtering unit 30 calculates a total sum of the word weights w for all the words that appeared in the entered information, from the word weights w and the frequencies of appearances of the appeared words. Then, the automatic filtering unit 30 compares this total sum with a prescribed threshold, and judges the entered information as inappropriate information if the total sum is greater than the threshold, or as appropriate information if the total sum is less than the threshold. This judgement result is then outputted from the output unit 40.

In the case of the exemplary weighted word list of FIG. 18, the weighted word list learning unit 60 obtains the weight of "image" as 10.9, the weight of "sample" as 18,7, the weight of "accident" as −16.6, the weight of "high school girl" as 82.2, the weight of "bus" as −101.9, the weight of "Hokkaido" as −112.5, and the weight of "free" as −6.3, from the learning data entered in advance. The weighted word list storage unit 50 stores these word weights. In this case, for an expression "a car accident in Hokkaido involving high school girls on a bus" as a whole, the total sum of the word weights calculated at the automatic filtering unit 30 will be 82.2−101.9−112.5−16.6=−148.8, while for an expression "sample images of a high school girl for free" as a whole, the total sum of the word weights calculated at the automatic filtering unit 30 will be 82.2+18.7+10.9−6.3=105.5. If the threshold is set to be 0 as in the processing of FIG. 17, the total sum for the expression "a car accident in Hokkaido involving high school girls on a bus" is lower than the threshold so that presentation of this information will not be blocked, while the total sum for the expression "sample images of a high school girl for free" is higher than the threshold so that presentation of this information will be blocked. Thus the correct judgement can be made.

Next, the principle for obtaining the word weights using the linear discrimination function will be described with references to FIG. 19 and FIG. 20.

Figure 19:
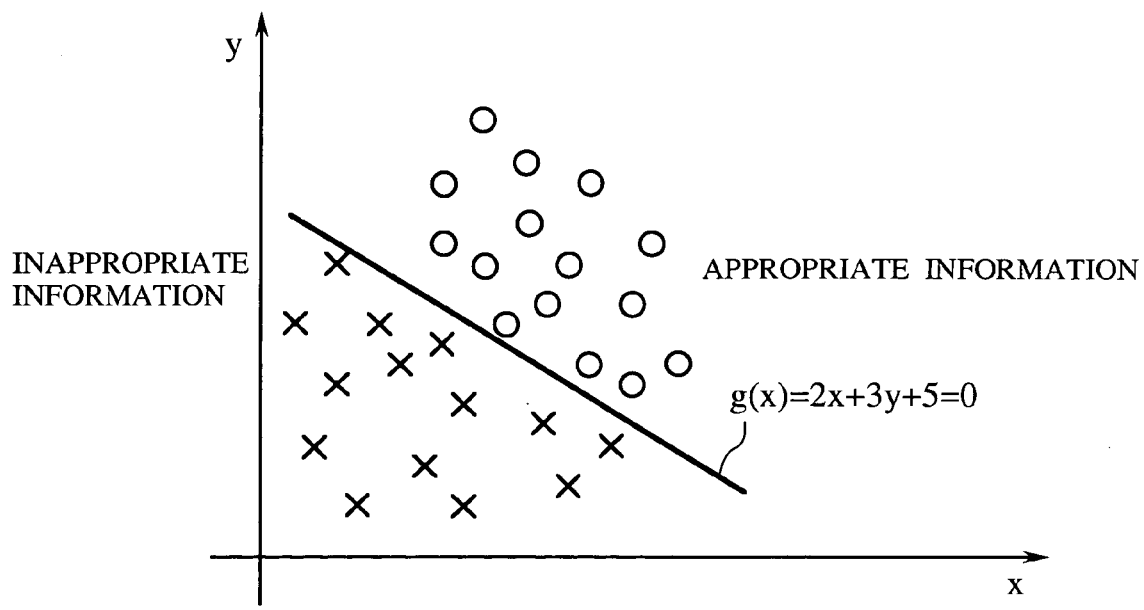
FIG. 19 and FIG. 20 are graphs for explaining a principle for obtaining a word weight using a linear discrimination function in the automatic information filtering apparatus of FIG. 16.
Figure 20:
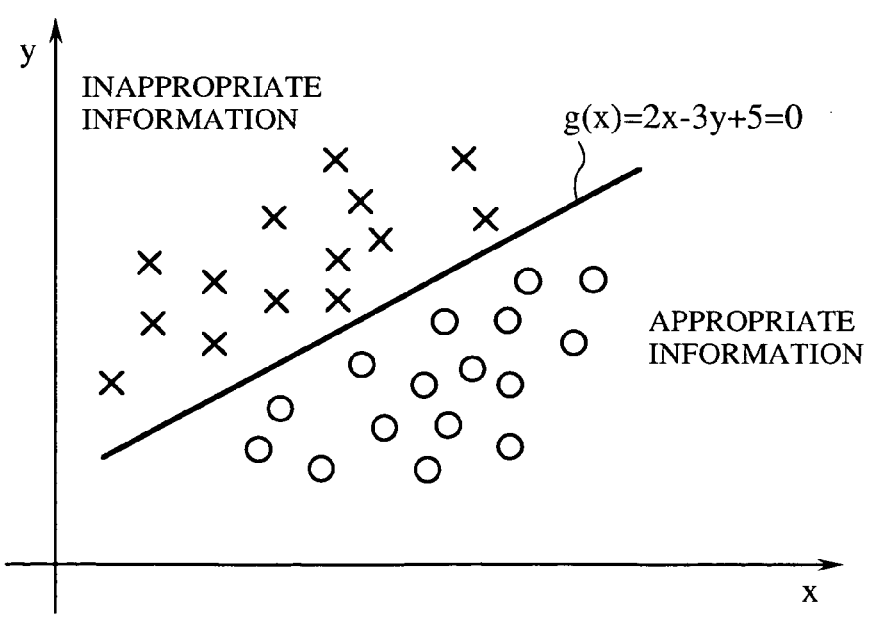

In FIG. 19 and FIG. 20, it is assumed that the vector space is two-dimensional space for the sake of simplicity, and each appropriate information is indicated by a circle mark (o) while each inappropriate information is indicated by a cross mark (x) on this vector space. The linear discrimination function is indicated by a straight line, which discriminates appropriate information and inappropriate information. Here, dimensions (x, y) of the vector space represent words used in judging whether information is inappropriate information or not, and coefficients of the linear discrimination function (such as a and b for a straight line given by ax+by +c=0) are given by the weights of the respective words.

Now, when the linear discrimination function is given by 2x+3y+5=0 as shown in FIG. 19, the weight of the word x is 2 and the weight of the word y is 3, ignoring the constant term. Consequently, when inappropriate information and appropriate information are distributed as shown in FIG. 19, the weights of all the words can take positive values. On the other hand, when inappropriate information and appropriate information are distributed as shown in FIG. 20, the linear discrimination function will be given by 2x−3y+5=0, so that the weight of the word x is 2 and the weight of the word y is −3. In other words, in this method of calculating the word weights, the sign (plus or minus) of each word weight is inessential, and there can be cases in which no word weight takes a negative value.

Figure 21:
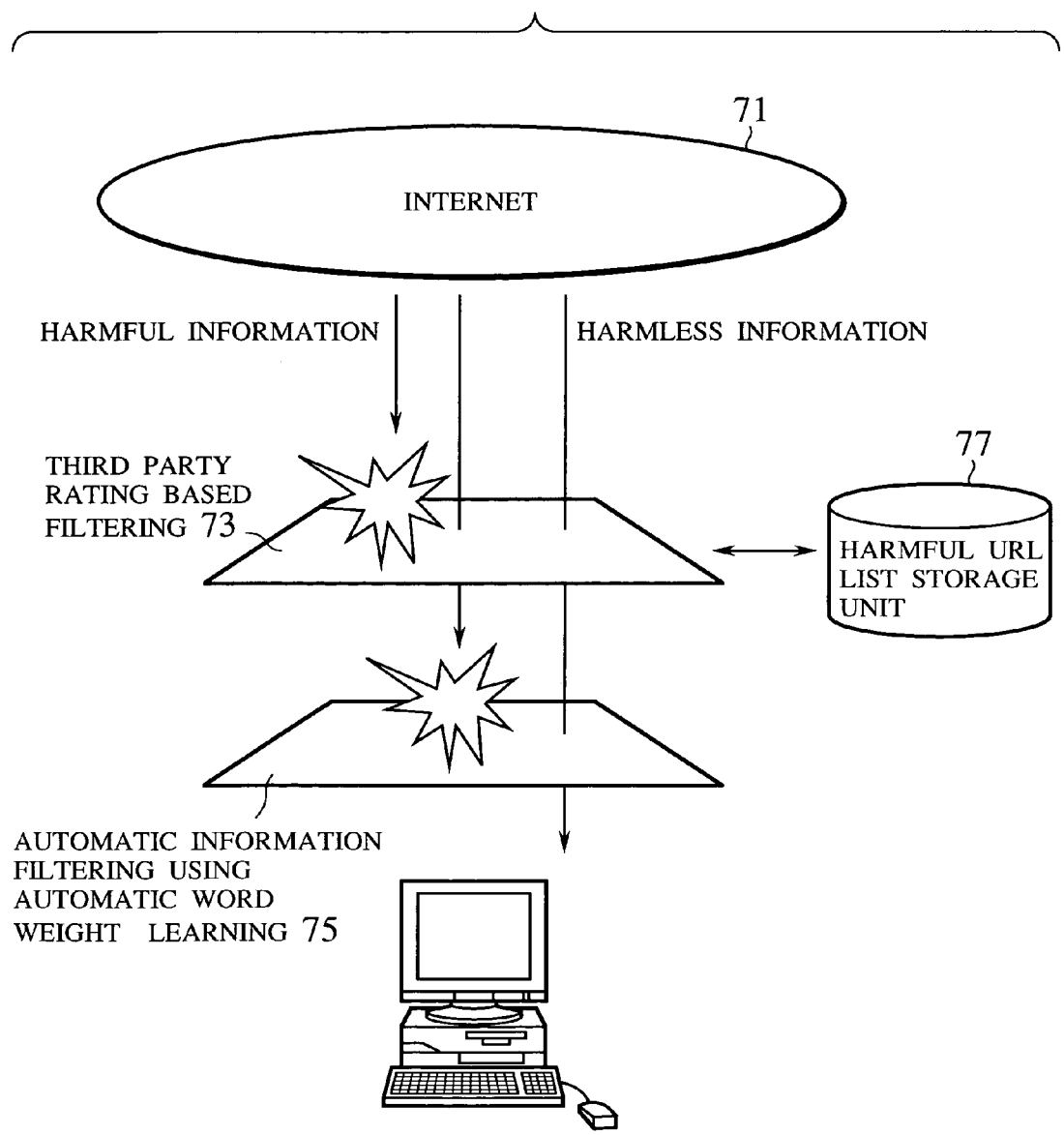
FIG. 21 is a schematic diagram showing an outline of an automatic information filtering apparatus according to the fourth embodiment of the present invention.

Referring now to FIG. 21, the fourth embodiment of method and apparatus for automatic information filtering according to the present invention will be described in detail.

In the automatic information filtering apparatus of the fourth embodiment shown in FIG. 21, a third party rating based filtering 73 using a harmful URL list storage 77 in referring to harmful URLs is added to the automatic information filtering using automatic word weight learning 75 of the third embodiment.

The harmful URL list storage unit 77 stores URLs that provide harmful information in a form of a harmful URL list, and the third party rating based filtering 73 compares a URL of the HTML document entered from the input unit with each URL registered in the harmful URL list in the harmful URL list storage unit 77 to see if there is any matching URL or not.

This automatic information filtering apparatus of FIG. 21 has a function for carrying out the filtering based on URLs by the third party rating based filtering 73 and the harmful URL list storage unit 77, in addition to a function for carrying out the filtering using weighted word list obtained by the automatic learning as in the third embodiment.

In this automatic information filtering apparatus of FIG. 21, a URL of the HTML document entered from the Internet 71 is compared with each URL registered in the harmful URL list in the harmful URL list storage unit 77, to see if there is any matching URL or not, by the third part rating based filtering 73. Then, if there is a matching URL in the harmful URL list, presentation of information indicated by this URL is blocked.

On the other hand, if there is no matching URL in the harmful URL list as a result of referring to the harmful URL list by the third party rating based filtering 73, the automatic information filtering using automatic word weight learning 75 is carried out as in the third embodiment.

In this fourth embodiment, both the third party rating based filtering and the filtering using automatic word weight learning are carried out so that it is possible to detect and block the harmful information accurately.

As described, according to the third and fourth embodiment, the word weights are obtained by the automatic learning using inappropriate information whose presentation should be blocked and appropriate information whose presentation should not be blocked as the learning data, and these word weights are stored and managed in correspondence to respective words in a form of the weighted word list. Then, words contained in the information provided from the Internet are extracted, the word weights for the extracted words are read out from the weighted word list, the total sum of these word weights is calculated, and whether presentation of this information should be blocked or not is judged according to the calculated total sum. Consequently, the word weights that are conventionally set in ad hoc manner can be obtained accurately by the automatic learning, and whether information is inappropriate information or not can be judged accurately by utilizing these accurately obtained word weights, so that it is possible to block presentation of inappropriate information accurately.

Also, the word weights are obtained by the automatic learning based on the linear discrimination function that can discriminate inappropriate information and appropriate information on the vector space, so that the word weights can be set accurately.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the automatic information filtering apparatus of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of automatic information filtering for identifying inappropriate information among various information provided through Internet and blocking presentation of identified inappropriate information, comprising the steps of:

entering an HTML (HyperText Markup Language) information provided through the Internet;

judging whether a URL (Uniform Resource Locator) of said HTML information entered from the Internet is a top page URL or not, the top page URL being a URL ending with a prescribed character string defining according to a URL hierarchical structure by which each URL is constructed;

extracting words appearing in information indicated by the top page URL and carrying out an automatic filtering to judge whether said information indicated by the top page URL is inappropriate or not according to the words extracted from said information indicated by the top page URL, when said URL of said HTML information is the top page URL;

registering an upper level URL derived from the top page URL into an inappropriate upper level URL list and blocking presentation of said information indicated by the top page URL, when said information indicated by the top page URL is judged as inappropriate by the automatic filtering, the upper level URL being derived from the top page URL by keeping a character string constituting the top page URL only up to a rightmost slash;

comparing said URL of said HTML information with each URL registered in the inappropriate upper level URL list and judging whether there is any matching URL in the inappropriate upper level URL list when said URL of said HTML information is not the top page URL, and blocking presentation of information indicated by said URL of said HTML information when there is a matching URL in the inappropriate upper level URL list, the matching URL being one upper level URL whose character string is contained in said URL of said HTML information;

extracting words appearing in said information indicated by said URL of said HTML information, and carrying out the automatic filtering to judge whether said information indicated by said URL of said HTML information is inappropriate or not according to the words extracted from said information indicated by said URL of said HTML information, when there is no matching URL in the inappropriate upper level URL list; and blocking presentation of said information indicated by said URL of said HTML information when said information indicated by said URL of said HTML information is judged as inappropriate by the automatic filtering.

2. The method of claim 1, further comprising the steps of:

registering in advance URLs that provide inappropriate information in an inappropriate URL list; and carrying out a third part rating based filtering for comparing said URL of said HTML information with each URL registered in the inappropriate URL list and judging whether there is any matching URL in the inappropriate URL list, and blocking presentation of said information indicated by said URL of said HTML information when there is a matching URL in the inappropriate URL list.

3. An automatic information filtering apparatus for identifying inappropriate information among various information provided through Internet and blocking presentation of identified inappropriate information, comprising:

an input unit for entering an HTML (HyperText Markup Language) information provided through the Internet;

a top page URL judging unit for judging whether a URL (Uniform Resource Locator) of said HTML information entered from the Internet is a top page URL or not, the top page URL being a URL ending with a prescribed character string defined according to a URL hierarchical structure by which each URL is constructed;

a first automatic filtering unit for extracting words appearing in information indicated by the top page URL and carrying out an automatic filtering to judge whether said information indicated by the top page URL is inappropriate or not according to the words extracted from said information indicated by the top page URL, when said URL of said HTML information is the top page URL;

an inappropriate upper level URL list registration unit for registering an upper level URL derived from the top page URL into an inappropriate upper level URL list and blocking presentation of said information indicated by the top page URL is judged as inappropriate by the automatic filtering, the upper level URL being derived from the top page URL by keeping a character string constituting the top page URL only up to a rightmost slash;

an inappropriate URL judging unit for comparing said URL of said HTML information with each URL registered in the inappropriate upper level URL list and judging whether there is any matching URL in the inappropriate upper level URL list when said URL of said HTML information is not the top page URL, and blocking presentation of information indicated by said URL of said HTML information when there is a matching URL in the inappropriate upper level URL list, the matching URL being one upper level URL whose character string is contained in said URL of said HTML information;

a second automatic filtering unit for extracting words appearing in said information indicated by said URL of said HTML information, and carrying out the automatic filtering to judge whether said information indicated by said URL of said HTML information is inappropriate or not according to the words extracted from said information indicated by said URL of said HTML information, when there is no matching URL in the inappropriate upper level URL list; and an information presentation blocking unit for blocking presentation of said information indicated by said URL of said HTML information is judged as inappropriate by the automatic filtering.

4. The apparatus of claim 3, further comprising:

an inappropriate URL list registration unit for registering in advance URLs that provide inappropriate information in an inappropriate URL list; and a third party rating based filtering unit for carrying out a third part rating based filtering for comparing said URL of said HTML information with each URL registered in the inappropriate URL list and judging whether there is any matching URL in the inappropriate URL list, and blocking presentation of said information indicated by said URL of said HTML information when there is a matching URL in the inappropriate URL list.

5. A computer usable medium having computer readable program codes embodied therein for causing a computer to function as an automatic information filtering apparatus for identifying inappropriate information among various information provided through Internet and blocking presentation of identified inappropriate information, the computer readable program codes include:

a first computer readable program code for causing said computer to enter an HTML (HyperText Markup Language) information provided through the Internet;

a second computer readable program code for causing said comptuer to judge whether a URL (Uniform Resource Locator) of said HTML information entered from the Internet is a top page URL or not, the top page URL being a URL ending with a prescribed character string defined according to the URL hierarchical structure by which each URL is constructed;

a third computer readable program code for causing said computer to extract words appearing in information indicated by the top page URL and carry out an automatic filtering to judge whether said information indicated by the top page URL is inappropriate or not according to the words extracted from said information indicated by the top page URL, when said URL of said HTML information is the top page URL;

a fourth computer readable program code for causing said computer to register an upper level URL derived from the top page URL into an inappropriate upper level URL list and block presentation of said information indicated by the top page URL, when said information indicated by the top page URL is judged as inappropriate by the automatic filtering, the upper level URL being derived from the top page URL by keeping a character string constituting the top page URL only up to a rightmost slash;

a fifth computer readable program code for causing said computer to compare said URL of said HTML information with each URL registered in the inappropriate upper level URL list and judge whether there is any matching URL in the inappropriate upper level URL list when said URL of said HTML information is not the top page URL, and block presentation of information indicated by said URL of said HTML information when there is a matching URL in the inappropriate upper level URL list, the matching URL being one upper level URL whose character string is contained in said URL of said HTML information;

a sixth computer readable program code for causing said computer to extract words appearing in said information indicated by said URL of said HTML information, and carry out the automatic filtering to judge whether said information indicated by said URL of said HTML information is inappropriate or not according to the words extracted from said information indicated by said URL of said HTML information, when there is no matching URL in the inappropriate upper level URL list; and a seventh computer readable program code for causing said computer to block presentation of said information indicated by said URL of said HTML information when said information indicated by said URL of said HTML information is judged as inappropriate by the automatic filtering.

6. The computer usable medium of claim 5, wherein the computer readable program codes further include:

an eighth computer readable program code for causing said computer to register in advance URLs that provide inappropriate information in an inappropriate URL list; and a ninth computer readable program code for causing said computer to carry out a third part rating based filtering for comparing said URL of said HTML information with each URL registered in the inappropriate URL list and judging whether there is any matching URL in the inappropriate URL list, and blocking presentation of said information indicated by said URL of said HTML information when there is a matching URL in the appropriate URL list.

\* \* \* \* \*

UNITED STATES PATENT AND TRADEMARK OFFICE
CERTIFICATE OF CORRECTION

PATENT NO.   : 6,976,070 B1
DATED        : December 13, 2005
INVENTOR(S)  : Keiichirou Hoashi et al.

It is certified that error appears in the above-identified patent and that said Letters Patent is hereby corrected as shown below:

Column 10,
Line 11, change "poage" to -- page --.

Column 11,
Line 31, change "$Vd=(fdl,...fdi...,fdn)$" to -- $\vec{Vd}=(fdl,...,\vec{fdi}...,fdn)$ --.
Line 61, change "when a document d is harmful and $Dis(d) \leqq 0$" to -- when a document d is harmful and $Dis(d) \leq 0$ --.

Column 14,
Line 5, change "tpo" to -- top --.

Signed and Sealed this

Eighteenth Day of April, 2006

JON W. DUDAS
*Director of the United States Patent and Trademark Office*